(12) United States Patent
Ohkawa

(10) Patent No.: US 6,834,973 B2
(45) Date of Patent: Dec. 28, 2004

(54) LIGHT GUIDE PLATE, SURFACE LIGHT SOURCE DEVICE AND LIQUID CRYSTAL DISPLAY

(75) Inventor: Shingo Ohkawa, Koshigaya (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 09/927,509

(22) Filed: Aug. 13, 2001

(65) Prior Publication Data

US 2003/0169384 A1 Sep. 11, 2003

(30) Foreign Application Priority Data

Aug. 16, 2000 (JP) ........................................ 2000-246935

(51) Int. Cl.$^7$ ............................................... F21V 7/04
(52) U.S. Cl. ........................... 362/31; 362/27; 362/561
(58) Field of Search ............................ 362/31, 26, 27, 362/561; 349/62, 64, 65; 385/146

(56) References Cited

U.S. PATENT DOCUMENTS

| | | | | |
|---|---|---|---|---|
| 4,373,282 A | * | 2/1983 | Wragg ........................... 40/546 |
| 4,737,896 A | * | 4/1988 | Mochizuki et al. ........... 362/301 |
| 5,331,530 A | * | 7/1994 | Scholz .......................... 362/293 |
| 5,341,231 A | * | 8/1994 | Yamamoto et al. ............ 349/63 |
| 5,703,667 A | * | 12/1997 | Ochiai ............................ 349/65 |
| 5,719,649 A | * | 2/1998 | Shono et al. .................. 349/65 |
| 6,334,690 B1 | * | 1/2002 | Ohkawa ........................ 362/31 |

* cited by examiner

*Primary Examiner*—Alan Cariaso
*Assistant Examiner*—Mark Tsidulko
(74) *Attorney, Agent, or Firm*—Staas & Halsey LLP

(57) ABSTRACT

A surface light source device and liquid crystal display are capable of direction-conversion effectively through a double reflections. A back face of a light guide plate 10 is provided with micro-reflectors projecting from a general plane of the back face. A main input light H1 to a micro-reflector 20 is incident to an incidence end face 12 (at point a) and inputted in a somewhat downward inclined direction. An inner input light is inner-reflected mainly by a gently inclined slope 21 (point b) and then impinges on a slope 22 to be reflected again (point c), becoming an inner output light IO. The inner output light IO is emitted from an emission face 13 (point d), being supplied to an LCD panel or the like after transmitting through a light diffusion sheet DF (points e and f). A reflection member RF having an irregular reflectivity, if disposed, recovers light leaking through the slope 22 to use the light efficiently again, thereby providing a reduced fine-unevenness in brightness.

21 Claims, 13 Drawing Sheets

LIGHT GUIDE PLATE, SURFACE LIGHT SOURCE DEVICE AND LIQUID CRYSTAL DISPLAY

BACKGROUND

1. Field of Invention

The present invention relates to a light guide plate which is supplied with light sideways and deflects the light to output from an emission face, further relating to a surface light source device employing the light guide plate, still further relating to a liquid crystal display employing the surface light source device for back-lighting or front-lighting.

2. Related Art

A surface light source device of a type comprises a light guide plate having an end face, through which light is introduced, and two major faces (i.e. faces larger than end faces) one of which provides an emission face, being employed for various uses such as back-lighting or front-lighting for a liquid crystal display. Basic performance of surface light source devices of such a type greatly depends on light guide plates employed therein.

A basic function of a light guide plate is to change a propagation direction (roughly in parallel with an emission face of the light guide plate) of light introduced into the light guide plate through a side end face so that the light is emitted from the emission face. As known well, a simply transparent light guide plate to which no modification is applied is capable of deflecting light slightly, providing an unsatisfactory brightness. Therefor any means for promoting emission from the emission face is required.

Means for promoting emission from a light guide plate relies upon one of the followings or some of them as combined.

(1) Scattering power within a light guide plate (light scattering guide plate);
(2) Emission face (a major face) provided with light diffusibility;
(3) Back face provided with light diffusibility;
(4) Emission face provided with light-refractive unevenness;
(5) Back face provided with light-refractive unevenness.

Ways based on (1) provide uniform and highly effective emission with ease. However, the emission is subject to have a preferential direction much inclined with respect to a frontal direction. (Usually, the inclination is about 60 to 75 degrees to a normal with respect to the emission face.) Accordingly, a member (prism sheet) for modifying the inclined direction to the frontal direction must be arranged. Although employment of a light diffusion sheet brings some increase in frontal emission, it involves a wide light diffusion which leads to reduction in light energy efficiency.

Ways based on (2) or (3) hardly provide uniform and effective emission. The emission is also preferentially directed to oblique directions as in the case of (1). An increased light diffusibility checks the efficiency because of factors such as wide range scattering or absorption by light scattering elements (e.g. white ink).

Ways based on (4) are capable of causing light to escape from the emission face with ease while positive direction conversions are less effected. Accordingly, it is hardly expected to realize a highly efficient emission. In particular, it is not advantageous that they fail to generate light which travels from the back face to the emission face.

Ways based on (5) positively generate light which travels from a back face to an emission face of a light guide plate, being free from wide range light scattering. Accordingly, the ways are latently capable of effectively generating an emission directed to approximately frontal directions. However, in practice, prior arts fail to control propagating direction of emission sufficiently.

FIG. 1a to FIG. 1c illustrate examples to which the above (5) is applied. Referring to the illustrations, reference number 1 indicates a light guide plate made of a transparent material such as acrylic resin, which has a side end face to provide an incidence end face 2. A primary light source L is disposed beside the incidence end face 2 to be supplied with light from the primary light source L. One of two major faces 3, 4 of the light guide plate 1 provides an emission face 3. The other major face (called "back face") is provided with a great number of recesses 5 with slopes 5a, 5b in profile.

The primary light source L emits light, which is introduced into the light guide plate 1 through the incidence end face 2. Upon encountering a recess, the propagation light within the light guide plate 1 (as represented by G1, G2) is inner-reflected by one slopes 5a to be directed to the emission face 3. Inner-incidence angle is denoted by θ and an emission derived from beams G1, G2 is denoted by G1', G2'. In other words, the slope 5a, which is relatively near to the incidence end face 2 (or primary light source L) compared with the other slope 5b, provides an inner-reflection slope for direction conversion. This effect is sometimes called edge-lighting effect.

The recesses 5 are formed like dots or linear channels. As shown in FIGS. 1a to 1c, formation pitch d, depth h or slope inclination φ of the recesses 5 is varied depending on distance from the incidence end face 2. Such variations prevent brightness on the emission face 3 from varying depending on distance from the incidence end face 2.

However, prior arts as shown in FIGS. 1a to 1c are subject to the following problems.

1. There is a region which is located behind the slope 5b as viewed from the incidence end face 2 and is hardly supplied with light. Therefore, a reduced formation pitch d gives no increasing in direction conversion efficiency, with the result that the emission face 3 is apt to show an unevenness in brightness.

2. Direction conversion is applied to only light that reaches the reflection surface (slope 5a), so to speak, directly, as G1, G2 shown in FIG. 1a, because direction conversion relies on only a single reflection (slope 5a) and no means for promoting incidence to the reflection surface (slope 5a) exists in the vicinity of the reflection surface. Consequently, it is difficult to realize an increased direction conversion efficiency.

OBJECT AND SUMMARY OF INVENTION

The present invention aims to overcome the above-mentioned problem s of prior arts. That is, an object of the present invention is to improve an light guide plate used for emitting light, which is introduced from a side end face (incidence end face), from an emission face so as to have no region which light is hard to reach and to have an emission direction easily controllable and further to have a high direction-conversion efficiency.

Another object of the present invention is provide a surface light source device which capable of providing an illumination output light directed around a frontal direction without need of a direction modifying member such as prism sheet by employing the light guide plate improved as above.

The present invention further aims to improve the surface light source device as to have an increased light using efficiency and a reduced fine-bright-dark-unevenness which would otherwise appear corresponding to a distribution of micro-reflectors by means of improved characteristics of the light guide plate.

A still another object is to provide a liquid crystal display which allows a comfortable observation from a desired direction by applying the surface light source device to a backlighting arrangement or frontlighting arrangement for the liquid crystal display.

The present invention solves the problems by forming a great number of micro-reflectors, each of which includes gentle and steep slopes having a inner reflection function, on a back face of a light guide, wherein a double reflections effected by the slope pair is adopted as a main means for applying direction conversion to light.

In the first place, the present invention improves a light guide plate that comprises an emission face provided by a major face, a back face provided by another major face and a side end face provided by a minor face, light inputting being done through said side end face and light outputting being done through said emission face.

According to the improvement, said back face is provided with a great number of micro-reflectors for conversion of an inputted light and each of said micro-reflectors includes a first slope and a second slope, said first slope being inclined with respect to an extending plane of said emission face more gently as compared with said second slope, wherein said inputted light is converted into an inner output light directed to said emission face by a pair of inner reflections effected by said first slope and then effected by said second slope, thereby being emitted from said emission face.

Since the light guide plate has the first slope gently inclined before (on the input side) the second slope producing an inner output light directed to the emission face, much light is guided smoothly to the second slope via the first slope. In addition such a main route, there is a subsidiary route which brings a direct incidence to the second slope (without via the first slope), with the result that an effective direction conversion is realized by the micro-reflectors.

It is noted that many cases show light coming directions which vary depending on position on the back face. To fit such situation, orientations of said great number of micro-reflectors may vary depending on position on said back face.

The present invention provides an improved surface light source device that employs the above light guide plate. The present invention improves a surface light source device comprising a light guide plate which has an emission face provided by a major face, a back face provided by another major face and a side end face provided by a minor face, light inputting being done through said side end face and light outputting being done through said emission face, the surface light source device further comprising at least one primary source for said light inputting.

According to the above features of the light guide plate, said back face is provided with a great number of micro-reflectors for conversion of an inputted light and each of said micro-reflectors includes a first slope and a second slope, said first slope being inclined with respect to an extending plane of said emission face more gently as compared with said second slope, and said inputted light being converted into an inner output light directed to said emission face by a pair of inner reflections effected by said first slope and then effected by said second slope, thereby being emitted from said emission face.

Since the light guide plate has the first slope gently inclined before (on the input side) the second slope producing an inner output light directed to the emission face, much light is guided smoothly to the second slope via the first slope. In addition such a main route, there is a subsidiary route which brings a direct incidence to the second slope (without via the first slope), with the result that an effective direction conversion is realized by the micro-reflectors.

As forementioned, many cases show light coming directions which vary depending on position on the back face. To fit such situation, orientations of said great number of micro-reflectors may vary depending on position on said back face.

For example, if an employed primary light source is a point-like light source, said great number of micro-reflectors are orientated preferably according to an orientation distribution such that said first reflection slope accepts said inputted light travelling radially.

It is noted that some leaking light is produced because a direct incidence to the second slope (i.e. subsidiary route) hardly satisfy the total reflection condition. Much of such leaking light can be recovered by a reflection member disposed along the back face of the light guide plate. Such light recovered by reflection returns into the light guide plate and has chances of emitting at various positions (on the emission face).

As a result, not only loss of light is avoided but also fine-unevenness in brightness, which is apt to appear on the emission face, is relaxed. The reflection member preferably has a moderate irregular reflectivity.

Said light inputting may be done from a plurality of directions different from one another. In this case, said great number of micro-reflectors are preferably classified regarding orientation into groups corresponding to said plurality of directions respectively so that micro-reflectors belonging to each of said groups has charge of a partial production of said inner output light according to a share allotted to each of said groups.

A surface light source device improved according to the above manners may be applied to a back-lighting-type LCD having a LCD panel illuminated from the back side or to a front-lighting-type LCD having a LCD panel illuminated from the front side.
front-lighting arrangement the light guide plate, still further relating to a liquid crystal display employing the surface light source device for back-lighting or front-lighting.

If so applied, the LCD reflects the characteristics of the surface light source device. Accordingly, the LCD in accordance with the present invention provides a display screen that looks bright as viewed from a desired direction or position.

BRIEF DESCRIPTION OF DRAWINGS

FIGS. 2a and 2b illustrate an outlined arrangement of a first embodiment in accordance with the present invention, FIG. 1a being a plan view from the back face side of a light guide plate, FIG. 1b being a side view from the left side in FIG. 1a;

FIGS. 3a and 3b illustrate an arrangement of micro-reflectors 20 in the first embodiment, FIG. 3a being an enlarged illustration of a circled part A in FIG. 2a, and FIG. 3b being an illustration of micro-reflector arrangement in a circled part B in FIG. 2a;

EMBODIMENTS (1) First Embodiment

Figure 1A:
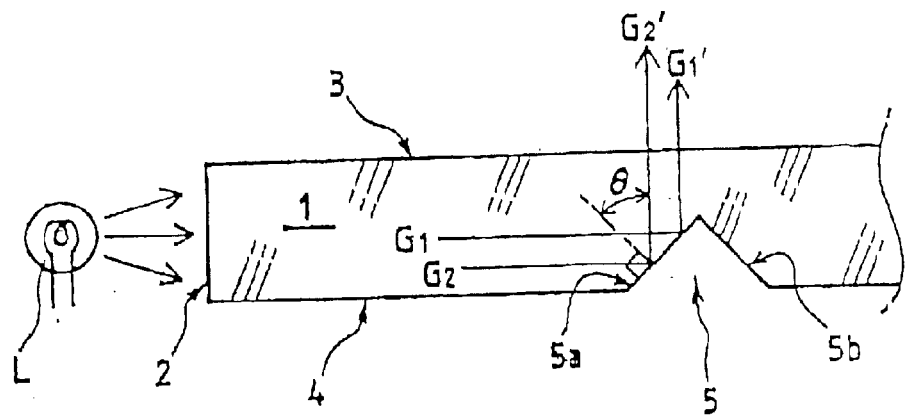
FIGS. 1a to 1c illustrate prior arts, FIG. 1a illustrating principle of edge-lighting, FIGS. 1b and 1c illustrating arrangements of recesses.
Figure 2A:
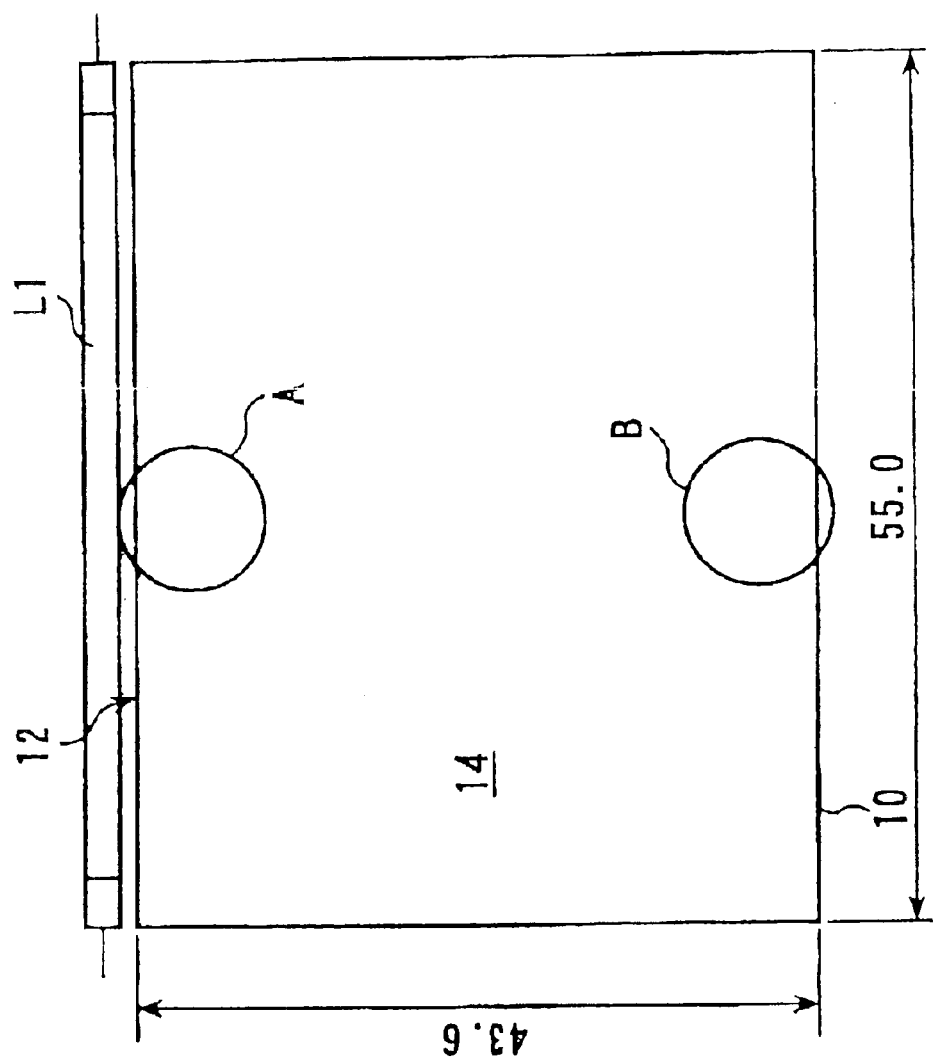
Figure 2B:
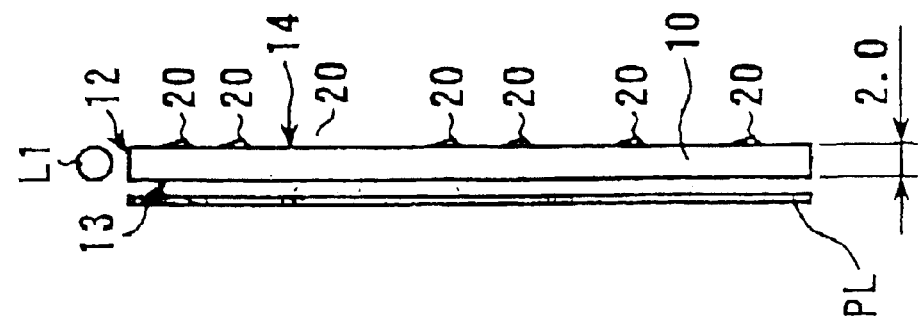

FIGS. 2a and 2b illustrate an outline of the first embodiment in accordance with the present invention. FIG. 2a is a plan view from the back face side of a light guide plate and FIG. 2b is a side view from the left side in FIG. 1a.

Referring to FIGS. 2a and 2b, a light guide plate 10 made of a transparent material such as acrylic resin, polycarbonate (PC) or cycloolefin-type resin has a minor face (side end face) to provide an incidence end face 12. A rod-like primary light source (cold cathode tube) L1 is disposed along the incidence end face 12 which is supplied with light from the light source. One of major faces 13, 14 of the light guide plate 10 provides an emission face 13. The other major face (back face) 14 is provided with a great number of micro-reflectors 20.

A well-known liquid crystal display panel PL is disposed on the outside of the emission face 13 to provide a backlight-type liquid crystal display. Note that data of dimensions in mm are merely examples.

The primary light source L1 emits light, which is introduced into the light guide plate 10 through the incidence end face 12. When light enters into a micro-reflector 20 on the way of propagation within the plate 10, the micro-reflector 20 effects mainly double reflections as described later therein to generate light which is directed to the emission face 13 (main route).

In other words, "input light to micro-reflectors 20 is converted into inner output light directed to the emission face 13", because the micro-reflectors 20 provide direction conversion means for converting a propagation direction of an inner propagation light. Configuration and operation of individual micro-reflector 20 are described in details later.

Figure 3A:
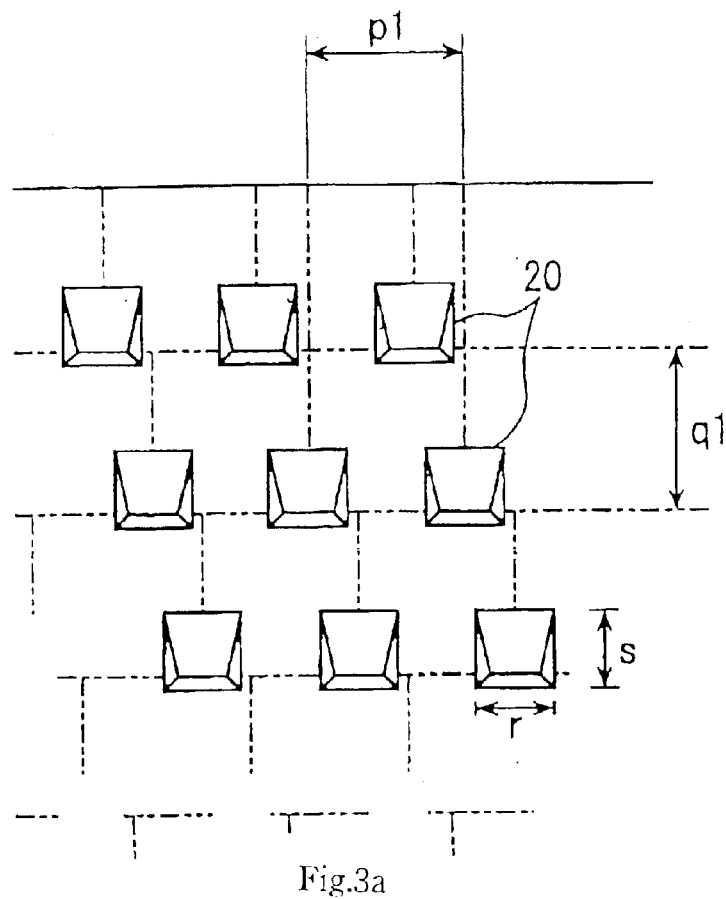
Figure 3B:
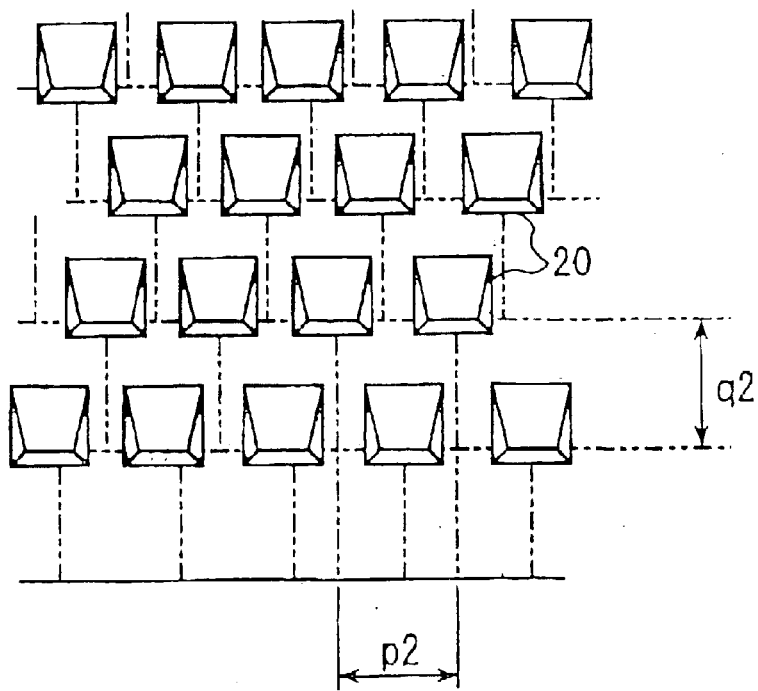

FIGS. 3a and 3b illustrate an arrangement of the micro-reflector 20 in this embodiment, FIG. 3a being an enlarged illustration of a circled part A in FIG. 2a, and FIG. 3b being an illustration of micro-reflector arrangement in a circled part B in FIG. 2a. As shown in the illustrations, formation pitches along traversing and vertical directions p and q are set so that p1=q2=230 µm around circle A and p2=q2=170 µm.

Although the shown values of p and q are merely examples, micro-reflectors 20 are distributed with a relatively small density in area A relatively near to the incidence end face 12 while they are distributed with a relatively large density in area B relatively far from the incidence end face 12. Formation pitch tends to get smaller gradually according to increasing distance from the incidence end face 12, although not shown, over the back face 14. In other words, formation density (covering rate) gets larger gradually according to increasing distance from the incidence end face 12.

Concrete values are determined in designing, being such as about 10% in area A near to the incidence end face 12 and about 30% in area B far from the incidence end face 12. Such low-and-high-adjusted covering rates uniformalize brightness over the emission face 13. It is noted that covering rate is defined as follows.

Covering rate=$S/(p \times q)$;

where S is cross section of a micro-reflector cut along a general plane of the back face 14 and p, q are formation pitches along traversing and vertical directions, respectively.

Note that "general plane of the back face 14" is a plane on which the back face 14 extends provided that the micro-reflectors are taken away.

Each micro-reflector 20 is shaped like a rectangular. Size is designed so that individual micro-reflector is hardly visible. Seeing that size of individual micro-reflector corresponds to the lower limit of formation pitch, small size micro-reflectors are preferable. Large formation pitch tends to bring a visible bright-dark pattern. Shown values, length and width of 100 µm(r=s=100 µm) are examples.

It should be noted that micro-reflectors 20 avoid from being aligned along a light coming direction (approximately vertical to incidence end face 12) in order to give chances of direction conversion evenly. That is, it is preferable that the arrangement of micro-reflectors 20 does not correspond to any precise two-dimension matrix. Such a manner of arrangement is also advantageous to make the micro-reflector arrangement inconspicuous as possible.

Figure 4:
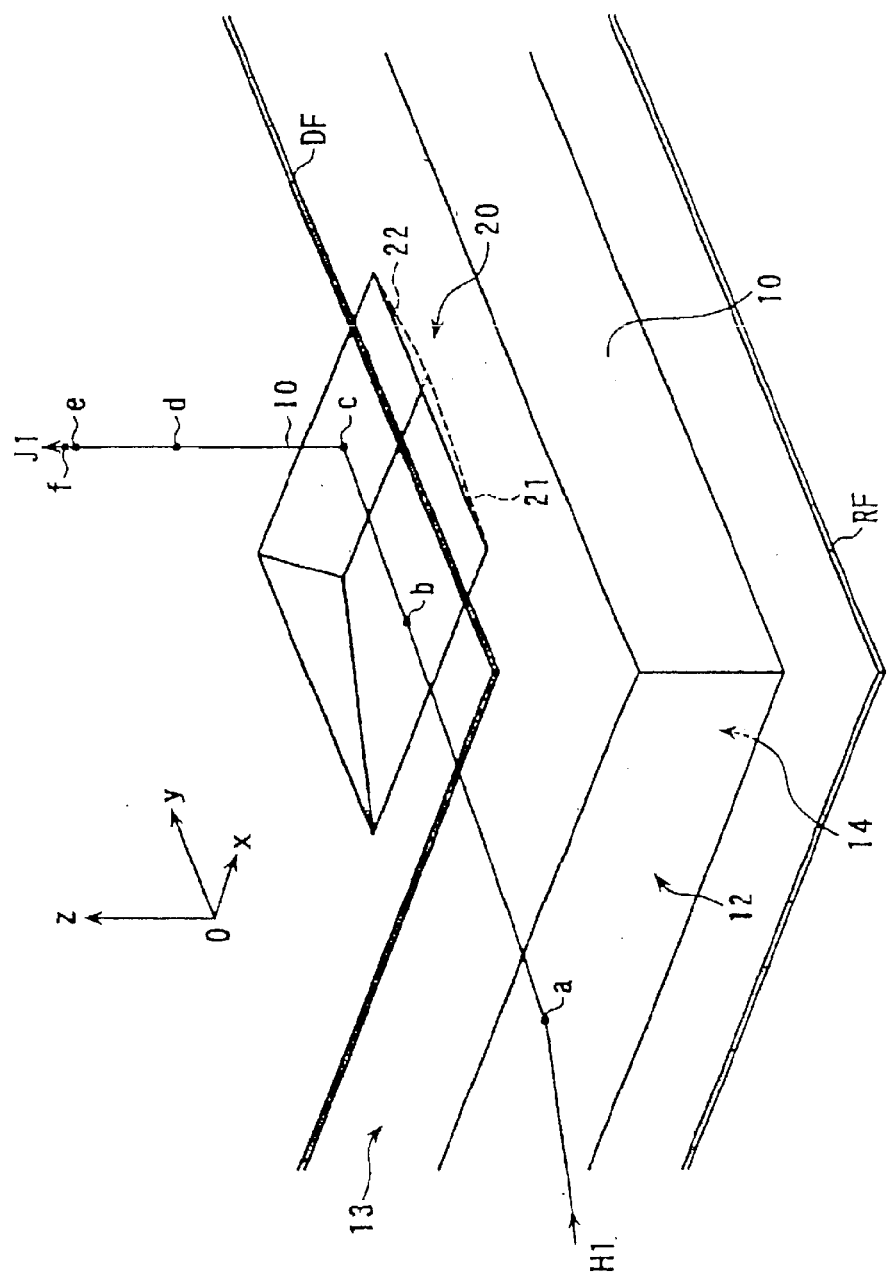
FIG. 4 is an enlarged perspective view illustrating a representative path (main route) of an input light to the light guide plate, the path showing a travelling until the light is emitted from an emission face after being direction-converted by a micro-reflector.

Next, a direction conversion function of the micro-reflector is described with referring to FIGS. 4 to 6. The following description is also applied to micro-reflectors employed of light guide plates employed in the other embodiments.

FIG. 4 illustrates a representative path (main route) from inputting of light to the light guide plate 10, via a micro-reflector 20, to emitting from the emission face 13. Size of the micro-reflector 20 is exaggerated for the sake of illustration. A Cartesian coordinates C-xyz is set so that zx-plane extends generally in parallel with the incidence end face 12 and xy-plane extends generally in parallel with the emission face 13.

Further to this, a light diffusion sheet DF is disposed additionally along the emission face 13 and a reflection sheet RF as a reflection member is disposed additionally along the back face 14. An LCD panel PL is not shown.

Figure 5A:
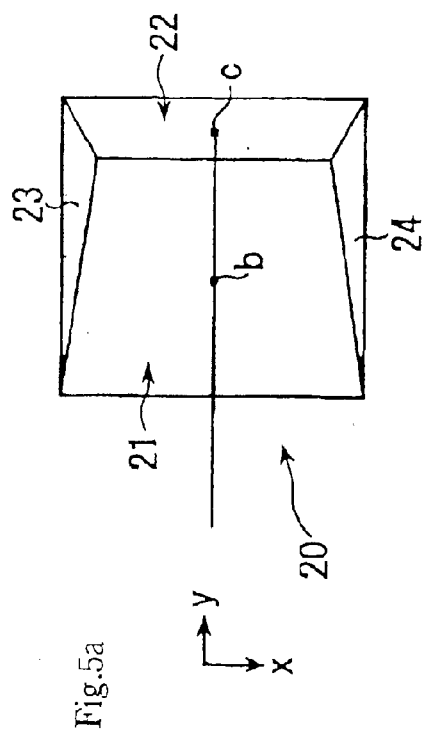
FIGS. 5a through 5c illustrating a direction conversion effect of a micro-reflector 20 shown in FIG. 4 from three directions, FIG. 7a being a view from +z direction, FIG. 7b being a view from +x direction and FIG. 7c being a view from +y direction.
Figure 5C:
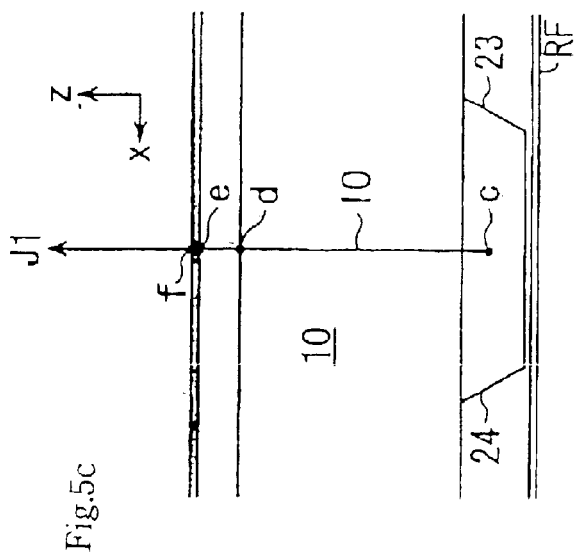
Figure 5B:
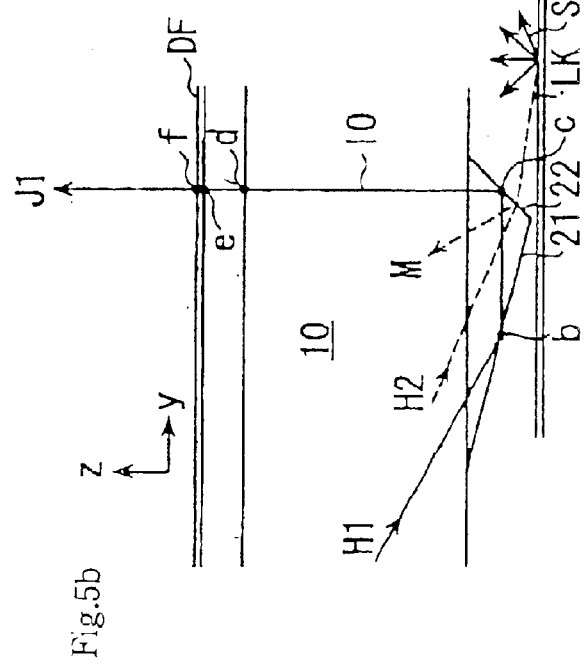

FIGS. 5a through 5c illustrating a direction conversion-effect of a micro-reflector 20 shown in FIG. 4 from three directions (from +z direction, from +x direction and then from +y direction).

Figure 6A:
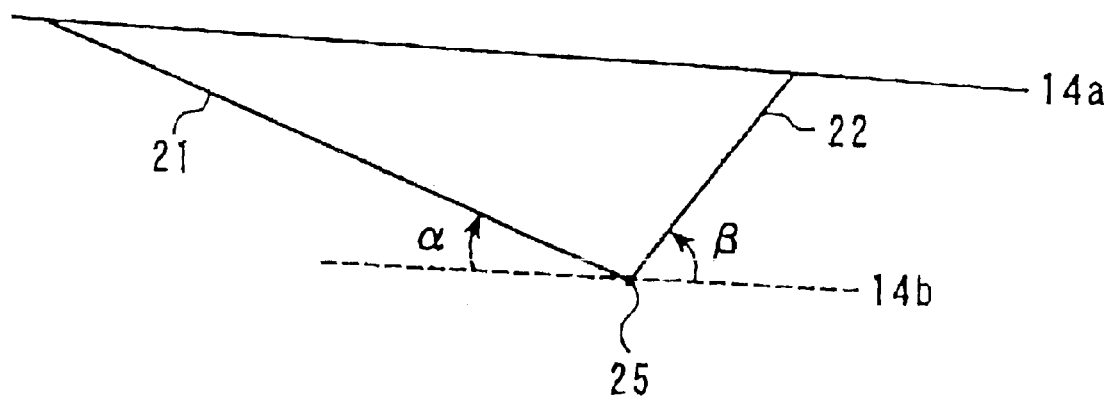
FIG. 6a illustrates inclinations of a pair of slopes for direction conversion and FIG. 6b illustrates a primary axis expressing an orientation of a micro-reflector.
Figure 6B:
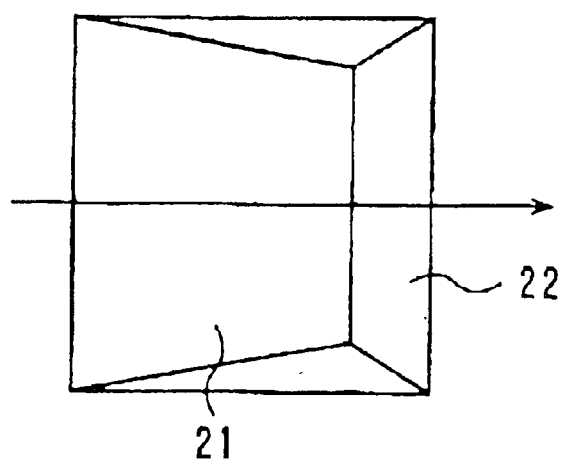

FIG. 6a is a micro-reflector 20 as viewed from +X-direction as in FIG. 5b, illustrating inclinations of a pair of slopes for direction conversion. FIG. 6b illustrates a primary axis expressing an orientation of a micro-reflector.

Referring to these illustrations, a micro-reflector 20 is configured so that it projects from a general plane of the back face 14 of the light guide plate 10. The micro-reflector 20 has a configuration like a block each of which has four faces 21, 22, 23 and 24.

The faces 21 and 22 are slopes which contribute to direction-converting, wherein the slope 21 provides a first slope inclined at angle α with respect to a plane representative of the back face 14 and the slope 22 provides a second slope inclined at angle β with respect to the plane 14a representative of the back face, as shown in FIG. 6. There is a relation, α<β.

It is to be noted that a dotted line 14b shown in FIG. 6 is a line that passes a meeting point 25 at which an intersection of the first and second slopes 21, 22 meets the plane of the drawing and extends in parallel with the plane 14a of the back face. The slopes 23 and 24 are, so to speak, both side flank faces in relation to the slopes 21 and 22, being preferably step like cliffs for preventing direction-conversion into undesirable directions from occurring.

As shown in FIG. 6b, "primary axis direction" is defined as marked by an arrow to express an orientation of a micro-reflector 20. Primary axis direction is directed from a center of the first slope 21 to that of the second slope 21. In the following description, an orientation of a micro-reflector 20 is represented by this primary axis direction.

According to such a definition, it is preferable in general that an orientation of a micro-reflector 20 is aligned to a main light coming direction (i.e. inputting direction to the micro-reflector 20). This approximately maximizes a light quantity of inner reflection at the first slope 21, accordingly providing an quantity of inner reflection at the first slope 21 an approximately maximized direction conversion efficiency.

In the illustrated example, a main input light to a micro-reflector 20 is represented by beams H1. A point a is an incidence point to the incidence face 12. In this arrangement employing the primary light source L1, the beam H1 is generally perpendicular to the incidence end face 12. However, light that is actually inputted into the micro-reflector 20 is not precisely parallel to the general plane of the back face 14 but progresses somewhat downward (so as to approach the back face 14).

Figure 1B:
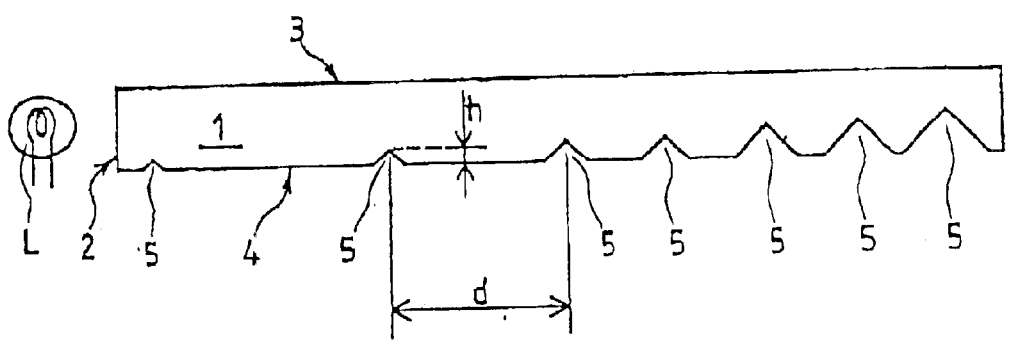
Figure 1C:
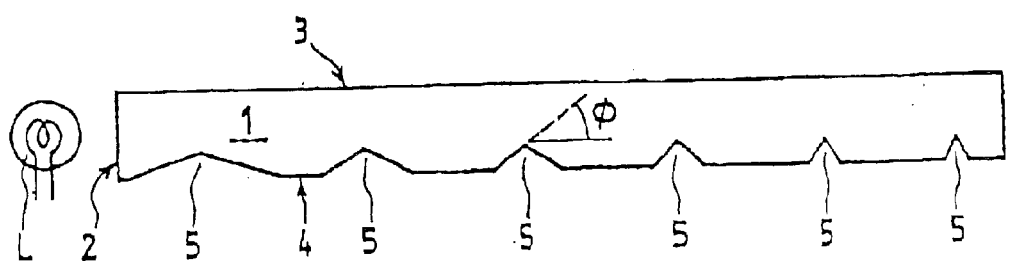

Light that progresses precisely parallel to the general plane of the back face 14 or approaches the emission face 13 advances deep without being inputted to the micro-reflector 20. Therefore the micro-reflector 20 does not obstruct light advancing and give no region which is supplied with light little, thereby functioning contrary to cases where recesses are formed (See FIG. 1).

Viewing from the standpoint of the beam H1, the gently inclined slope 21 functions as a guiding portion which accept a light inputting widely before the slope 22. The beam H1 is incident to the slope 21 as a large incident angel and almost of the incident light is subject to total reflection (point b) because the slope 21 is inclined gently. The inner-reflected light (totally-reflected light) travels generally along +y-direction, being immediately inner-incident to the slope 22 (point c).

This inner-incidence brings an inner output light IO, which is emitted from the emission face 13 as an output light J1 (point d). In the illustrated example, the output light J1 is incident to the diffusion sheet DF (point e), being then emitted from the diffusion sheet DF (point f) to be supplied to the LCD panel PL (See FIG. 2).

The diffusion sheet DF is employed and disposed, as required, in order to prevent, through a weak diffusion effect, micro-reflectors 20 bringing a fine-unevenness in brightness which could appear depending on position related to "presence or absence of any micro-reflector".

The inner output light IO or output light (main route) J1 has a travelling direction which can be controlled in a considerable range through adjusting the inclinations α and β. If the directions of the slopes 21 and 22 of all micro-reflectors are adjusted so that every inner output light IO, which is made from an input light H1 in accordance with a main light coming direction, has a direction that generally accords with a normal with respect to the emission face 13, almost the whole of the emission face 13 provides an output light like a parallel flux directed to a generally frontal direction.

In general, concrete values of inclination angles α and β are designed and determined as to fit a desired direction of output light J1 (main route). According to an example of practical value ranges, α=about 15 degrees ±10 degrees and β=about 45 degrees ±5 degrees.

An input light to a micro-reflector 20 includes some light H2 (subsidiary light) that is incident to the slope 22 at a small incidence angle without dropping in the slope 21 on the way as indicated by a dotted line in FIG. 5b. A remarkable part of such light H2 becomes a leaking light LK and the rest becomes an inner reflection light M. The inner reflection light M has also a chance of being emitted from the emission face later. However, its emission direction is generally different from that of J1 on the main route.

The leaking light LK is reflected by the reflection member RF and at least some of the reflected light is returned to the light guide plate 10, having a chance of being emitted from the emission face as the inner reflection light M. This emission has a direction generally different from that of J1 on the main route. If the reflection member RF has an irregular reflectivity, a scattering light SC is produce, which makes returning into the light guide plate 10 easy. Therefore it is preferable that the reflection member RF has an irregular reflectivity.

It is to be noted that positions at which an inner reflection light M and returning light from the reflection member RF escapes from the emission face 13 are supposed to scarcely correspond to the locations of the micro-reflectors 20 in contrary to escaping positions of the main output light J1.

Consequently, it is rather advantageous that the output light includes these light beams other than the main light J1, since a fine-unevenness depending on position corresponding to presence/absence of micro-reflector is thereby avoided, which is a merit that can be realized by the present invention. This merit is great if the disposed reflection member RF has an irregular reflectivity.

(2) Second Embodiment

Figure 7:
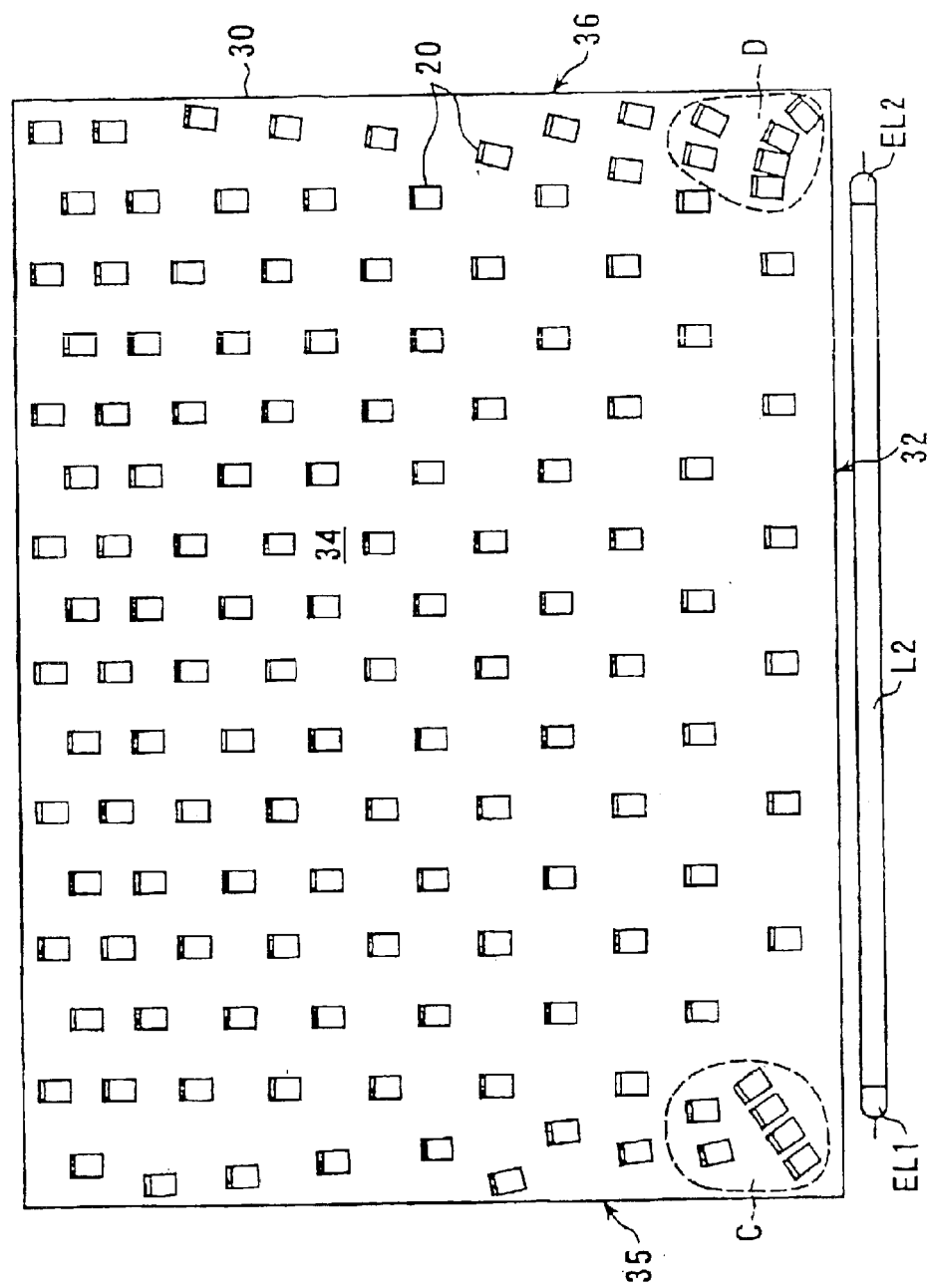
FIG. 7 is a plan view illustrates an arrangement of micro-reflectors in a second embodiment.

Although the second embodiment has an outline similar to that of the first embodiment as shown in FIGS. 2a, 2b, the second embodiment employs another light guide plate different from one employed in the first embodiment. In the second embodiment, a light guide plate 30 as shown in FIG. 7 is adopted instead of the light guide plate 10.

The light guide plate 30 is made of a transparent material such as acrylic resin, polycarbonate (PC) or cycloolefin-type resin, which has a side end face to provide an incidence end face 32.

A rod-like primary light source (cold cathode tube) L2 is disposed along the incidence end face 32 which is supplied with light from the light source. It should be noted that the cold cathode tube L2 has a light emitting portion length of which is smaller a little than that of the incidence end face 32. Both ends provide electrode portions EL1 and EL2 which are not capable of emitting light. Such a design is often employed in order to avoid the electrode portions EL1, EL2 from protruding.

A great number of micro-reflectors 20 are formed on a back face 34. Arrangement and orientation of the micro-reflectors 20 involves the following features.

1. Covering rate tends to increase according to distance from the incidence end face 32. This prevents brightness on an emission face from varying depending on distance from the incidence end face 32.

2. Micro-reflectors 20 are arranged in corner areas C, D near to the electrode portions EL1, EL2 at a specially large density. This prevents, together with orientation of the following item 4, prevents dark areas corresponding to the areas C, D from emerging on the emission face.

3. Micro-reflectors 20 are orientated almost over the back face 34 so as to be approximately vertical to the incidence end face 32 and to be aligned to a depth direction. In other words, each micro-reflector 20 is orientated so that its slope 21 is located nearer to the incidence end face 32 as compared with the slope 22.

4. In the corner areas C, D, micro-reflectors 20 are obliquely orientated with respect to incidence end face 32, with the slopes 21 being directed to the light emitting portion of the cold cathode tube L2. This causes these micro-reflectors 20 to be orientated corresponding to light coming directions, thereby rising direction conversion efficiency.

5. In both side edge portions 35, 36 except the corner areas C, D, micro-reflectors 20 are orientated so as to be inclined at small angles with respect to the incidence end face 32, with the slopes 21 being directed to the light emitting portion of the cold cathode tube L2. This causes these micro-reflectors 20 to be orientated corresponding to light coming directions, as the above item 4, thereby rising direction conversion efficiency.

6. Micro-reflector arrangement does not have regularity such that many micro-reflectors 20 align along a straight line. This makes the micro-reflectors 20 more inconspicuous. And besides, if incorporated in a liquid crystal display, the micro-reflectors can avoid from bringing Moire fringes which would be caused by an overlapping relation with a matrix-like electrode arrangement.

(3) Third Embodiment

Figure 8:
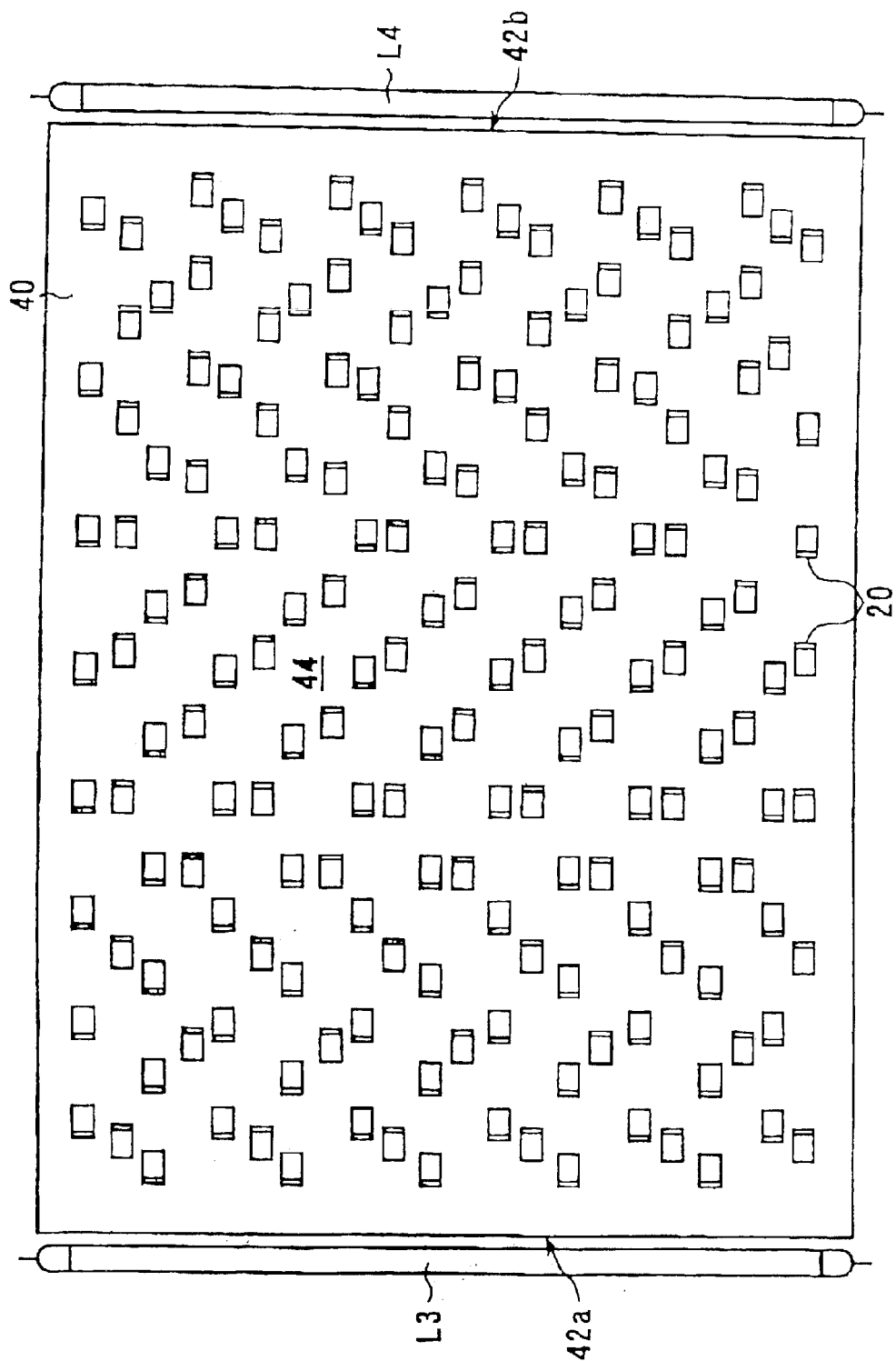
FIG. 8 is a plan view illustrates an arrangement of micro-reflectors in a third embodiment.
Figure 9:
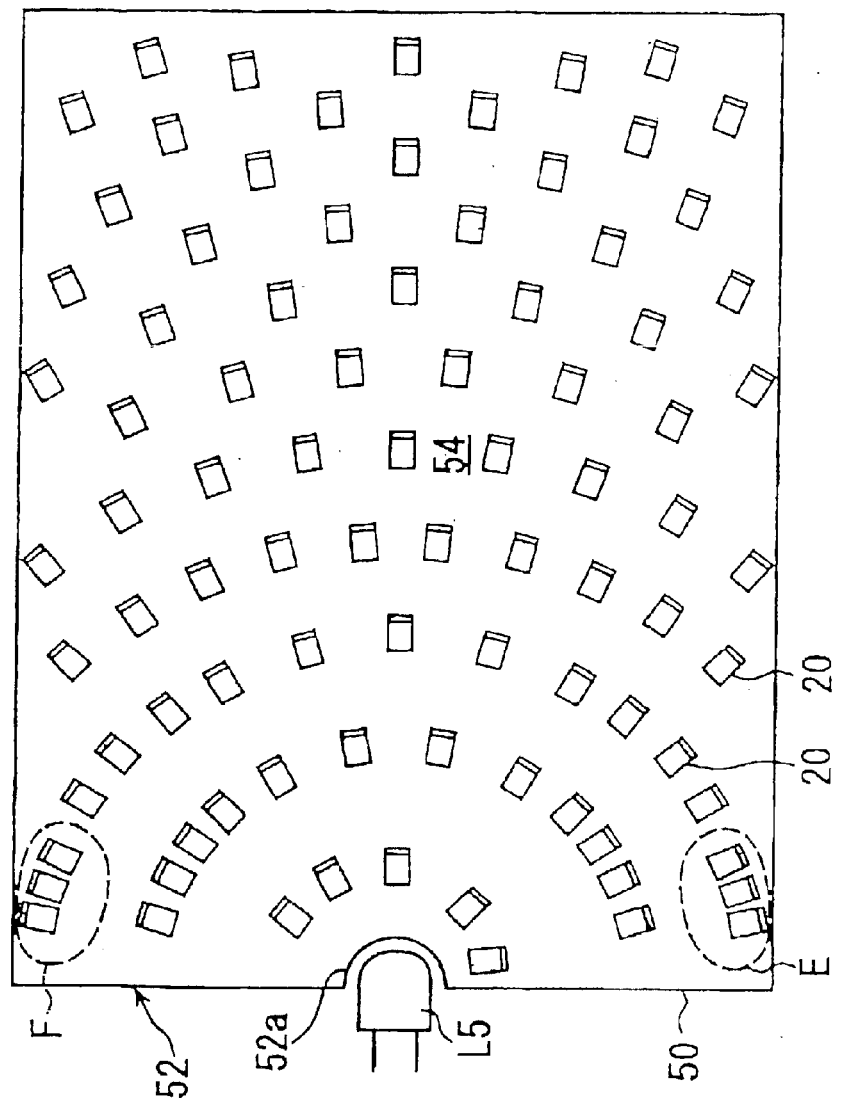
FIG. 9 is a plan view illustrates an arrangement of micro-reflectors in a forth embodiment.

Although the third embodiment has an outline similar to that of the first or second embodiment, the third embodiment employs another light guide plate different from ones employed in the first and second embodiments. In the present embodiment, a light guide plate 40 as shown in FIG. 8 is adopted. The light guide plate 40 is made of a transparent material such as acrylic resin, polycarbonate (PC) or cycloolefin-type resin, having two side end faces to provide two incidence end faces 42a, 42b.

Rod-like primary light sources (cold cathode tube) L3, L4 are disposed along the incidence end faces 42a, 42b which are supplied with light from the light sources, respectively. A great number of micro-reflectors 20 are formed on a back face 44. Arrangement and orientation of the micro-reflectors 20 involves the following features.

1. Covering rate and orientation of the micro-reflectors 20 are designed as follows.

First, covering rate and orientation distribution (called Distribution 1) are designed so that brightness is uniform over an emission face under a provisional condition that only L3, one of the primary light sources, supplies light.

Next, covering rate and orientation distribution (called Distribution 2) are designed so that brightness is uniform over an emission face under another provisional condition that only the other primary light source L4 supplies light.

Distribution 1 and Distribution 2 are piled up to determine a covering rate and orientation distribution (i.e. Distribution 1+Distribution 2) to be employed in the present embodiment.

Micro-reflectors according to Distribution 1 provide a first group and micro-reflectors according to Distribution 2 provide a second group. Micro-reflectors belonging to one group and the other are not different in shape and size, preferably being roughly equal to each other in number.

Covering rate according to group 1 tends to increase as distance from the incidence end face 42a increases while that according to group 2 increases as distance from the incidence end face 42b increases.

Consequently, gradient of Distribution 1 tends to cancel that of Distribution 2 as a whole. In the illustrated example, a resultant covering rate is approximately constant.

The micro-reflectors 20 are orientated so as to be aligned roughly vertical to the incidence end face 42. It should be noted that slopes 21 of micro-reflectors 20 of group 1 are directed to the incidence end face 42a while slopes 21 of micro-reflectors 20 of group 2 are directed to the incidence end face 42b.

It is to be noted that such grouping technique may be applied to cases where three or more light inputting directions exist. For instance, if light supply is effected from four directions corresponding to four end side faces, four light inputting directions are provided and the micro-reflectors are classified into four groups according which covering rate distribution and orientation distribution are designed.

Total covering rate distribution and total orientation distribution are obtained by piling each covering rate distribution and orientation distribution, respectively, in a manner like that in the above two group case.

2. As in the case of the embodiment 2, micro-reflector arrangement does not have regularity such that many micro-reflectors 20 align along a straight line. This makes the micro-reflectors 20 more inconspicuous. And besides, if incorporated in a liquid crystal display, the micro-reflectors can avoid from bringing Moire fringes which would be caused by an overlapping relation with a matrix-like electrode arrangement.

(4) Fourth Embodiment

Although the forth embodiment has an outline similar to that of the first, second or third embodiment, the forth embodiment employs a different light guide plate and primary light source. In the present embodiment, a light guide plate 50 and primary light source L5 as shown in FIG. 8 are adopted.

The light guide plate 50 is made of a transparent material such as acrylic resin, polycarbonate (PC) or cycloolefin-type resin, having a side end face 52 with a recess 52a to provide an incidence end face at a central portion of the side end face 52.

The primary light source L5 is a point-like light source, for instance, provided with LED (Light Emitting Diode). It should be noted that "point-like light source" is defined as a light source that has an light emitting area smaller by far than the extending area of the incidence face 52. The primary light L5 is disposed so that the light guide plate 50 is supplied with light through the recess 52a. A great number of micro-reflectors 20 are formed on a back face 54. Arrangement and orientation of the micro-reflectors 20 involves the following features.

1. Covering rate tends to increase according to distance from the recess 52a. This prevents brightness on an emission face from varying depending on distance from the recess 52 (or the point-like light source L5).

2. Micro-reflectors 20 are orientated radially with respect to the recess 52a over the back face 54. Slope 21 of each micro-reflector is generally directed to the recess 52a.

3. If the point-light source L5 has emitting characteristics with directivity to a frontal direction, covering rate of micro-reflector 20 may be set large around the side end faces 52. In particular, it is preferable to set a great covering rate in corner areas E and F.

4. Micro-reflector arrangement does not have regularity such that many micro-reflectors 20 align along a straight line. This makes the micro-reflectors 20 more inconspicuous. And besides, if incorporated in a liquid crystal display, the micro-reflectors can avoid from bringing Moire fringes which would be caused by an overlapping relation with a matrix-like electrode arrangement.

(5) Fifth Embodiment

Figure 10:
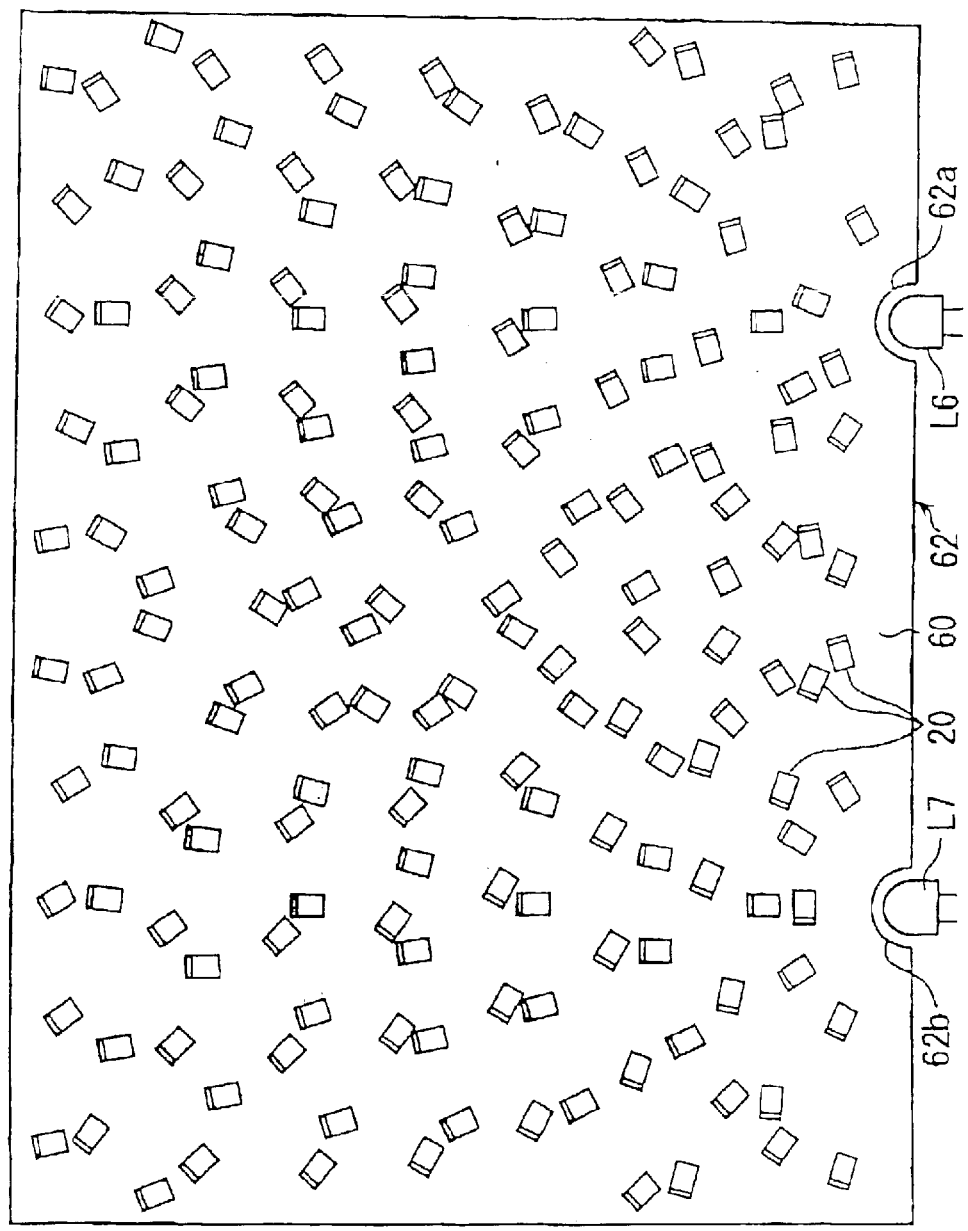
FIG. 10 is a plan view illustrates an arrangement of micro-reflectors in a fifth embodiment.

Although the fifth embodiment has an outline similar to that of the above-described embodiments, in particular, that of the forth embodiment, the fifth embodiment employs a different light guide plate and primary light sources. In the present embodiment, a light guide plate 60 and two primary light sources L6 and L7 as shown in FIG. 10 are adopted.

The light guide plate 60 is made of a transparent material such as acrylic resin, polycarbonate (PC) or cycloolefin-type resin, having a side end face 62 with recesses 62a and 62b to provide incidence end faces.

The primary light sources L6 and L7 are point-like light sources like ones employed in the forth embodiment, for instance, being arranged so that the light guide plate 60 is supplied with light through the recesses 62a and 62b, respectively. A great number of micro-reflectors 20 are formed on a back face 64. Arrangement and orientation of the micro-reflectors 20 involves the following features.

1. Covering rate and orientation of the micro-reflectors 20 are designed, in view of positions in relation to the recesses 62a and 62b, so that brightness variation does not appear on an emission face.

First, covering rate and orientation distribution (called Distribution 3) are designed so that brightness is uniform over an emission face under a provisional condition that only L6, one of the primary light sources, supplies light. Micro-reflectors according to this Distribution 3 provides a group (called group 3).

Next, covering rate and orientation distribution (called Distribution 4) are designed so that brightness is uniform over an emission face under another provisional condition that only the other primary light source L7 supplies light. Micro-reflectors according to this Distribution 4 provides a group (called group 4).

Distribution 3 and Distribution 4 are piled up to determine a covering rate and orientation distribution (i.e. Distribution 3 for group 3+Distribution 4 for group 4) to be employed in the present embodiment.

Covering rate according to Distribution 3 tends to increase as distance from the primary light source L6 increases while that according to Distribution 4 increases as distance from the primary light source L7 increases.

Consequently, gradient of Distribution 3 tends to cancel that of Distribution 4 as a whole. In the illustrated example, a resultant covering rate is approximately constant.

Micro-reflectors 20 of group 3 are arranged radially with respect to the recess 62a according to Distribution 3 while micro-reflectors 20 of group 4 are arranged radially with respect to the recess 62b according to Distribution 4. Slopes 21 of the former (group 3) are directed to the recess 62a while slopes 21 of the latter (group 4) are directed to the recess 62b.

As described above, such a grouping method like that used in the third embodiment may be applied to cases where a plurality of light supply positions exist and correspondingly a plurality of inputting directions exist. In this embodiment, two light supply positions are employed. However, if light supply is effected from three or more positions, an increased number of groups are prepared and covering distribution and orientation distribution can be designed for each group.

2. Micro-reflector arrangement does not have regularity such that many micro-reflectors 20 align along a straight line. This makes the micro-reflectors 20 more inconspicuous. And besides, if incorporated in a liquid crystal display, the micro-reflectors can avoid from bringing Moire fringes which would be caused by an overlapping relation with a matrix-like electrode arrangement.

(6) Sixth Embodiment

Figure 11:
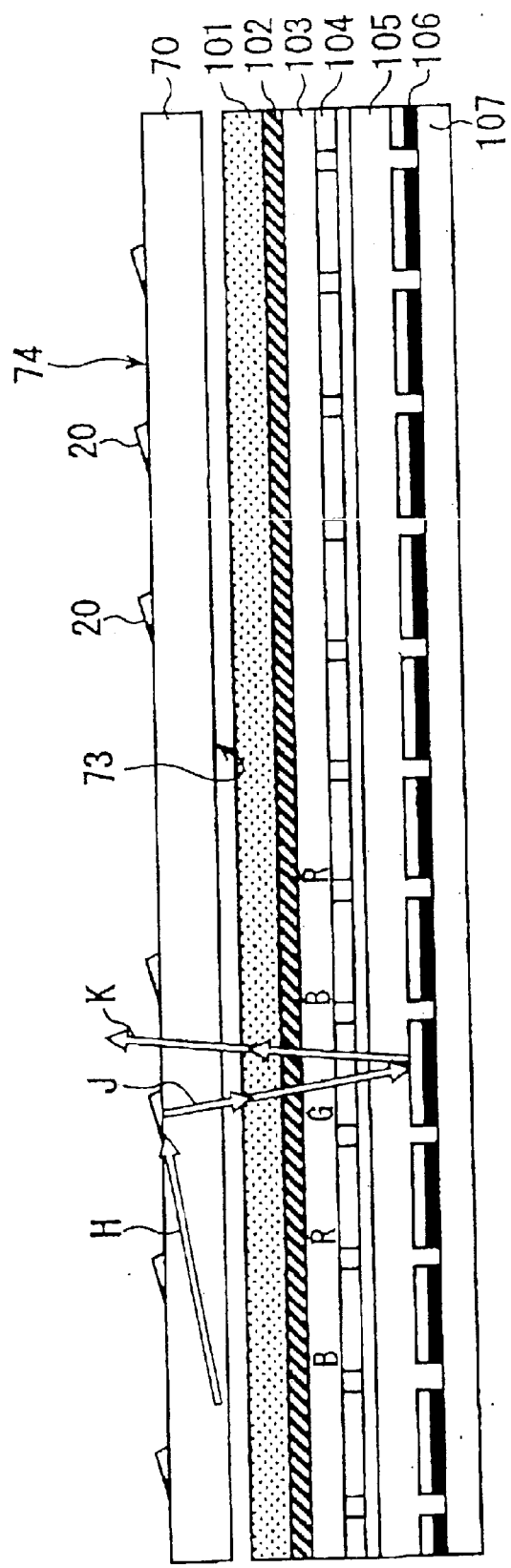
FIG. 11 is a cross section view illustrating a sixth embodiment wherein a surface light source device in accordance with the present invention is applied to a front lighting arrangement in a front-lighting-type liquid crystal display.

The present invention may be applied to front-lighting for a liquid crystal display of front-lighting-type, as shown in FIG. 11. This is described as the sixth embodiment.

A light guide plate 70 of a surface light source device used for front-lighting is arrange in the front of a liquid crystal display panel (i.e. on the viewing side), The liquid crystal display panel is composed of a scattering film (light diffusing sheet) 101, polarization plate 102, first glass substrate 103, color filter 104, liquid crystal cell 105, mirror surface reflection electrode 106, and a second glass substrate 107. The color filter 104 has three primary color regions R, G and B. Such structure and operation of the liquid crystal display panel are known well and detailed description is omitted.

The light guide plate 70 and a primary light source (not shown) may be arranged in a manner as adopted in any of the first through fifth embodiments.

The light guide plate 70 employed for front-lighting is disposed so that an emission face 73 just faces the liquid crystal display panel. As indicated with references H, J, K, when light H propagating in the light guide plate 70 is inputted into the a micro-reflector 20, double inner reflections as aforesaid follows to convert the inputted light into inner output J. Inner output J is emitted through the emission face 73 in a generally frontal direction, being incident to the liquid crystal display panel.

The mirror surface reflection electrode 106 reflects inner output light J reaching the electrode via the scattering film (light diffusing sheet) 101, polarization plate 102, first glass substrate 103, color filter 104 and liquid crystal cell 105. This reflected light comes to the polarization plate 102 again via the liquid crystal cell 105, color filter 104 and the first glass substrate 103. The polarization plate 102 effects transmitting or blocking for each pixel depending on ON/OFF-state of the corresponding mirror surface reflection electrode 106 (i.e. depending on polarization state).

If the mirror surface reflection electrode 106 allow the reflected light to transmits through the polarization plate 102, the light is emitted from a back face 74 as displaying light K after passing through the scattering film (light diffusion sheet) 101 and the light guide plate 70. It should be noted that light encountering any micro-reflector 20 on the back face 74 is reflected in a manner like retro-reflection to be directed again to the liquid crystal display panel and leads to no useless consumption.

Figure 12:
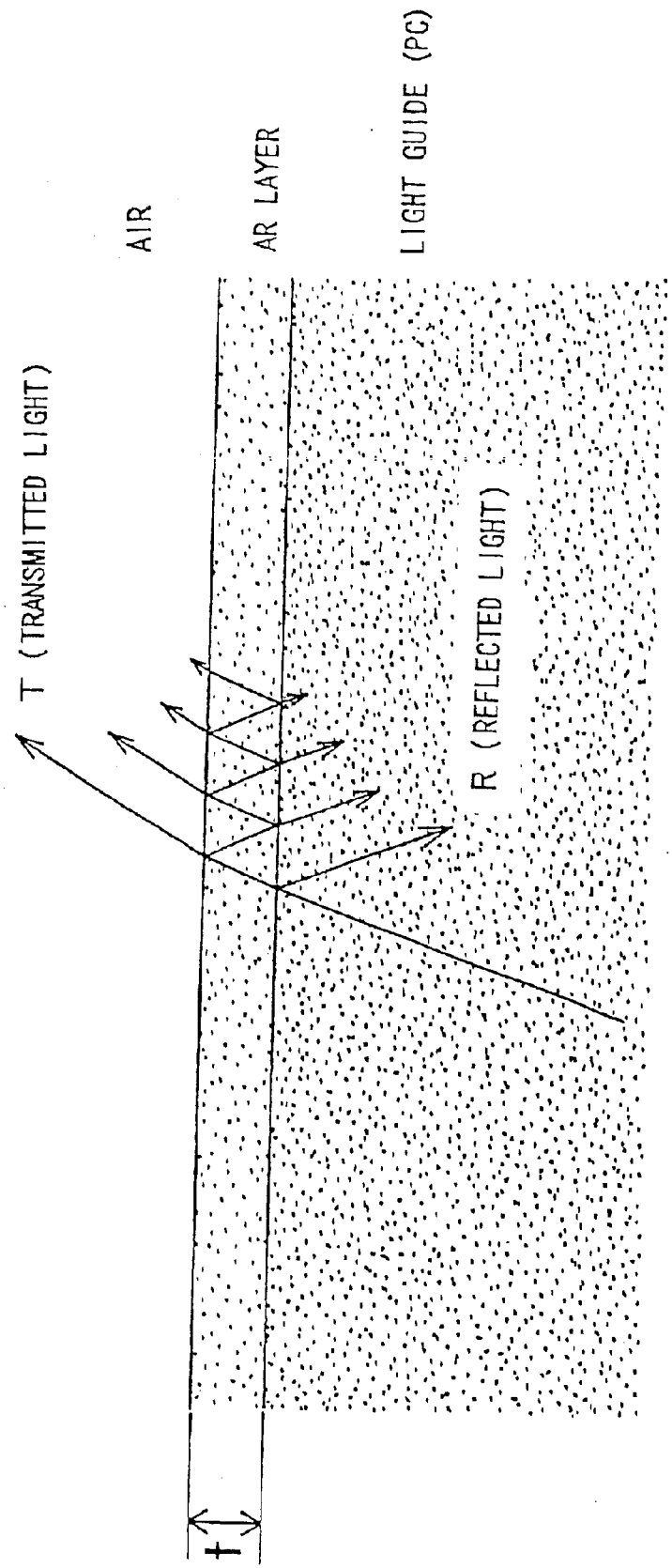
FIG. 12 illustrates an effect of an antireflection film.

It is preferable to apply an antireflection layer to the emission faces of the light guide plates employed in the above-described embodiments, in particular in the sixth embodiment. FIG. 12 is a cross section view to illustrate an example of an antireflection layer applied to an emission face of a light guide plate. The antireflection layer AR is, for example, made of MgF2(refractive index=1.38), having a thickness of t=99.6 μm. The light guide plate is made of polycarbonate (PC;refractive index=1.58).

Some of the light inner-incident to the emission face is reflected at PC—MgF2 interface and MgF2-air interface, with some of the other being transmitted. As known well, if relation among factors such as thickness and refractive index of the anti reflection layer AR, and wavelength and incidence angle is such that transmitting light T is enforced by virtue of interference and reflection light R is weaken by virtue of interference, the anti reflection layer AR demonstrates its antireflection function.

Figure 13:
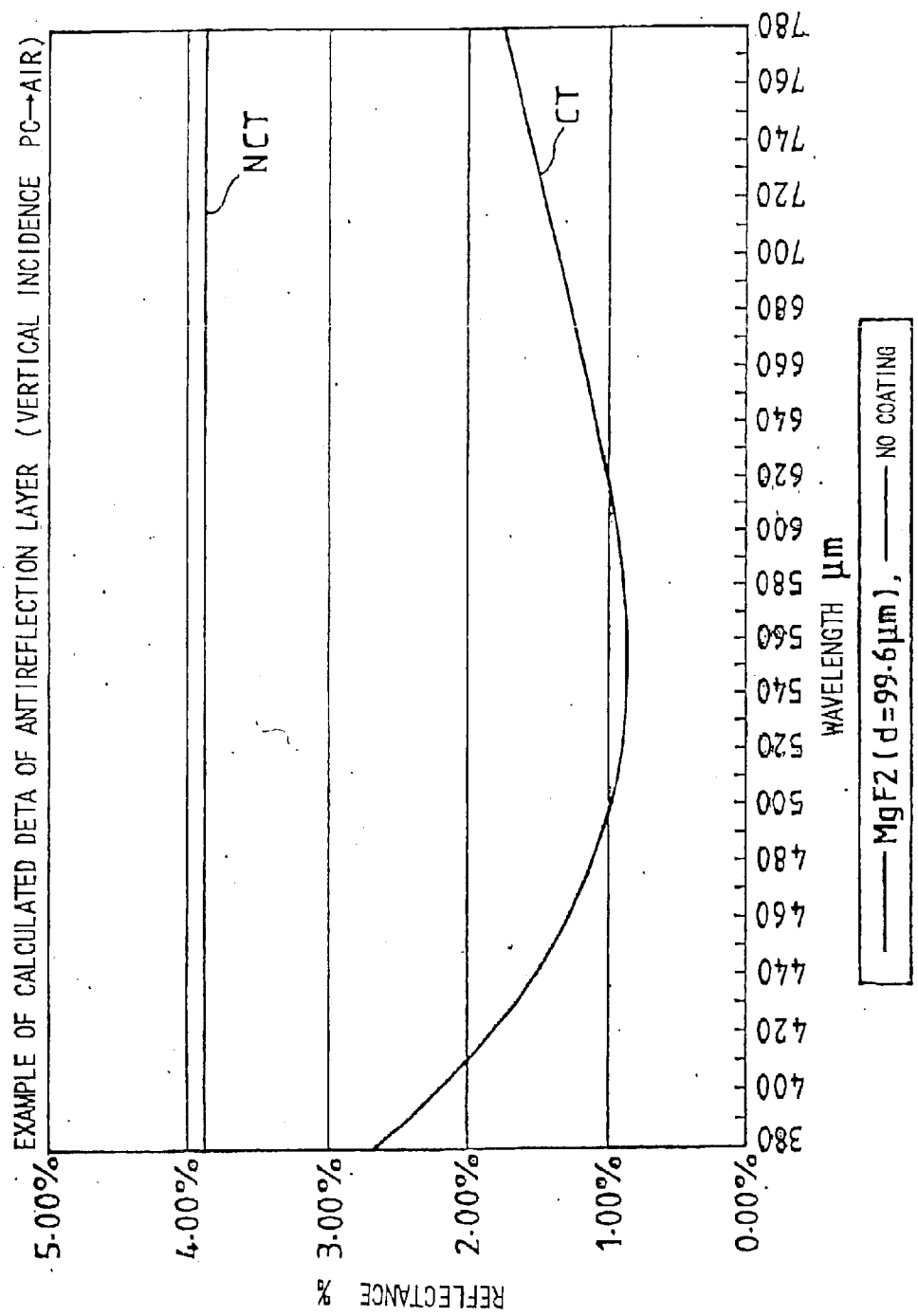
FIG. 13 is a graph illustrating exemplarily characteristics of an antireflection film.

FIG. 13 is a graph illustrating reflection coefficient (100%—emission coefficient) of vertical incidence light as a function of wavelength under the above conditions, with an illustration of a case where no antireflection layer is applied. As understood from the graph, reflection coefficient keeps approximately a constant value, 3.8% in the case of no antireflection layer (NCT). To the contrary, if the above antireflection layer is applied (CT), reflection coefficient falls into a low-value range from 1% to 2% for light within a wavelength region from 400 μm to 780 μm.

Accordingly, if such a antireflection layer is applied to the emission faces of the light guide plates employed in the embodiments, in particular in the sixth embodiments, the emission faces provide smooth emission with reduction of noise which is originated from reflection.

As described above, the present invention micro-reflectors distributed on a back face of a light guide plate realizes an effective direction conversion by means of mainly double reflections. Inner output light at the case can be adjusted through directions of a gently inclined slope and an output side slope, Therefore, an emission toward useless directions can be avoided, contrasted with direction conversion relying upon scattering or diffusing. And emission toward a frontal direction or a direction around the frontal direction is achieved without employing a prism sheet. Further, applications such as to back-lighting-type liquid crystal displays can be realized under a reduced fine-unevenness in brightness by means of a reflection member.

What is claimed is:

1. A light guide plate comprising:
   an emission face provided by a major face;
   a back face provided by another major face; and
   a side end face provided by a minor face, light inputting being done through said side end face and light outputting being done through said emission face,
   wherein said back face is provided with a great number of micro-reflectors discretely arranged for conversion of an inputted light and each of said micro-reflectors includes a first slope and a second slope, said first slope being inclined with respect to an extending plane of said emission face more gently as compared with said second slope; and
   said inputted light being converted into an inner output light directed to said emission face by a pair of inner reflections effected by said first slope and then effected by said second slope, thereby being emitted from said emission face.

2. A light guide plate as defined in claim 1, wherein orientations of said great number of micro-reflectors vary depending on position on said back face.

3. A surface light source device comprising:
   a light guide plate which has an emission face provided by a major face, a back face provided by another major face and a side end face provided by a minor face, light inputting being done through said side end face and light outputting being done through said emission face; and
   at least one primary source for said light inputting,
   wherein said back face is provided with a great number of micro-reflectors discretely arranged for conversion of an inputted light and each of said micro-reflectors includes a first slope and a second slope, said first slope being inclined with respect to an extending plane of said emission face more gently as compared with said second slope; and
   said inputted light being converted into an inner output light directed to said emission face by a pair of inner reflections effected by said first slope and then effected by said second slope, thereby being emitted from said emission face.

4. A surface light source device as defined in claim 3, wherein a reflection member is disposed along said back face.

5. A surface light source device as defined in claim 4, wherein said reflection member has an irregular reflectivity.

6. A surface light source device as defined in claim 3, 4 or 5, wherein orientations of said great number of micro-reflectors vary depending on position on said back face.

7. A surface light source device as defined in claim 6, wherein said primary light source is a point-like light source, thereby causing said inputted light to travel radially and said great number of micro-reflectors are orientated according to an orientation distribution such that said first reflection slope accepts said inputted light travelling radially.

8. A surface light source device as defined in claim 6, wherein said light inputting is done from a plurality of directions different from one another and said great number of micro-reflectors are classified regarding orientation into groups corresponding to said plurality of directions respectively so that micro-reflectors belonging to each of said groups has charge of a partial production of said inner output light according to a share allotted to each of said groups.

9. A surface light source device as defined in claim 3, 4, or 5, wherein said light inputting is done from a plurality of directions different from one another and said great number of micro-reflectors are classified regarding orientation into groups corresponding to said plurality of directions respectively so that micro-reflectors belonging to each of said groups has charge of a partial production of said inner output light according to a share allotted to each of said groups.

10. A surface light source device as defined in claim 9, wherein said primary light source is a point-like light source, thereby causing said inputted light to travel radially and said great number of micro-reflectors are oriented according to an orientation distribution such that said first reflection slope accepts said inputted light traveling radially.

11. A liquid crystal display having a liquid crystal display panel and a surface light source device for illumination, said liquid crystal display panel comprising:
   a light guide plate which has an emission face provided by a major face, a back face provided by another major face and a side end face provided by a minor face, light inputting being done through said side end face and light outputting being done through said emission face; and
   at least one primary source for said light inputting,
   wherein said back face is provided with a great number of micro-reflectors discretely arranged for conversion of an inputted light and each of said micro-reflectors includes a first slope and a second slope, said first slope being inclined with respect to an extending plane of said emission face more gently as compared with said second slope; and said inputted light being converted into an inner output light directed to said emission face by a pair of inner reflections effected by said first slope and then effected by said second slope, thereby being emitted from said emission face.

12. A liquid crystal display as defined in claim 11, wherein orientations of said great number of micro-reflectors vary depending on position on said back face.

13. A liquid crystal display as defined in claim 11 or 12, wherein said light inputting is done from a plurality of directions different from one another and said great number of micro-reflectors are classified regarding orientation into groups corresponding to said plurality of directions respectively so that micro-reflectors belonging to each of said groups has charge of a partial production of said inner output light according to a share allotted to each of said groups.

14. A liquid crystal display as defined in claim 13, wherein said liquid crystal display panel is illuminated by said surface light source device from a front side.

15. A liquid crystal display as defined in claim 14, wherein a reflection member is disposed along said back face.

16. A liquid crystal display as defined in claim 13, wherein said liquid crystal display panel is illuminated by said surface light source device from a back side.

17. A liquid crystal display as defined in claim 16, wherein said reflection member has an irregular reflectivity.

18. A liquid crystal display as defined in claim 11 or 12, wherein said liquid crystal display panel is illuminated by said surface light source device from a front side.

19. A liquid crystal display as defined in claim 11 or 12, wherein said liquid crystal display panel is illuminated by said surface light source device from a back side.

20. A liquid crystal display as defined in claim 19, wherein a reflection member is disposed along said back face.

21. A liquid crystal display as defined in claim 20, wherein said reflection member has an irregular reflectivity.

\* \* \* \* \*